Figure 3:
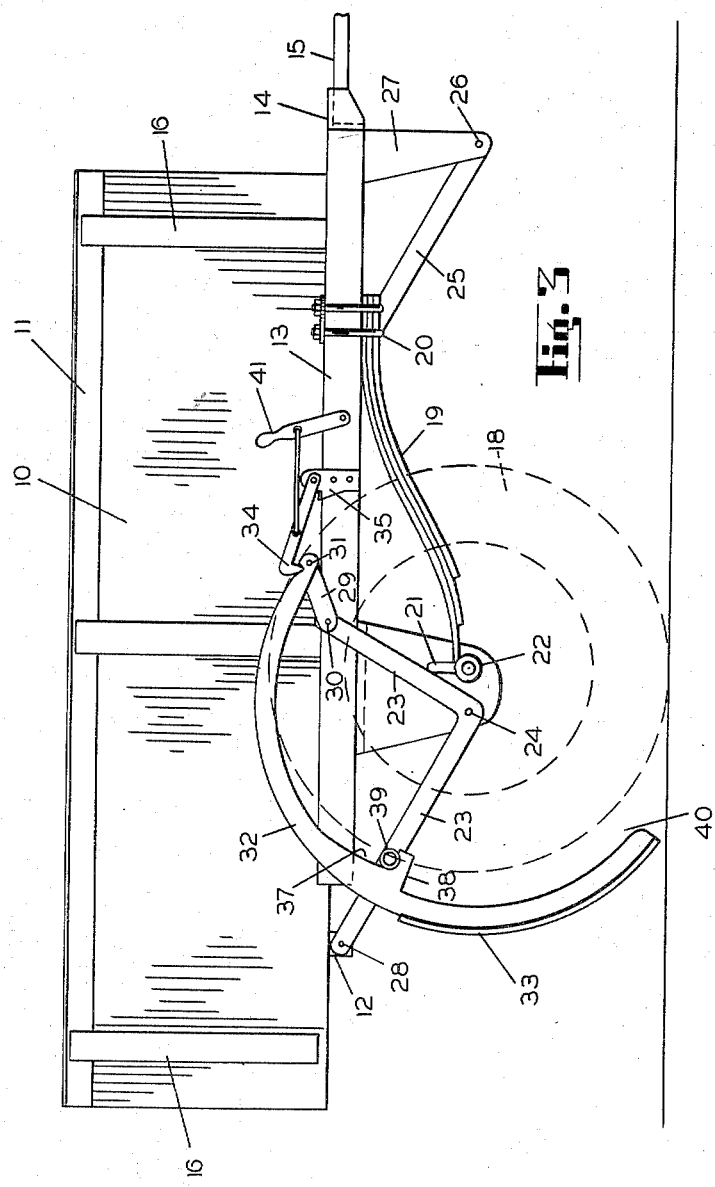

Jan. 9, 1951  B. J. PAULSON  2,537,907
VERTICAL ADJUSTABLE TRUCK
Filed Sept. 9, 1949  2 Sheets-Sheet 1
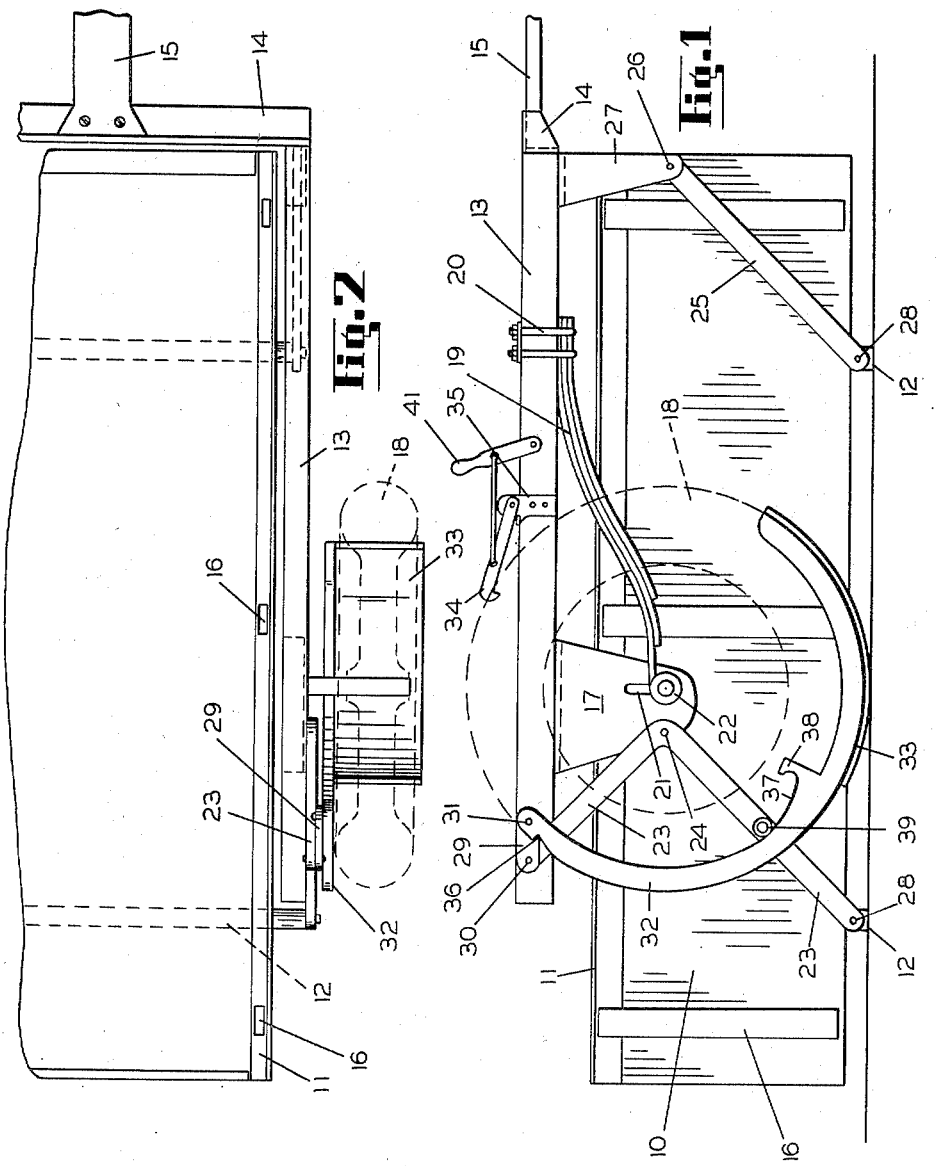
INVENTOR.
BERNARD J. PAULSON
BY
Christian R. Nielsen
ATTORNEY.

Jan. 9, 1951

B. J. PAULSON 2,537,907

VERTICAL ADJUSTABLE TRUCK

Filed Sept. 9, 1949

2 Sheets-Sheet 2

INVENTOR.
BERNARD J. PAULSON
BY
Christian R. Nielsen
ATTORNEY.

Patented Jan. 9, 1951

2,537,907

UNITED STATES PATENT OFFICE 2,537,907

VERTICAL ADJUSTABLE TRUCK

Bernard J. Paulson, Waukesha, Wis.

Application September 9, 1949, Serial No. 114,853

3 Claims. (Cl. 280—44)

My invention relates to trailers and more particularly to a two or four-wheel trailer that may be attached to the rear of a tractor or automobile and employed to convey farm products or the like.

An object of my invention is to provide a trailer that is constructed in a manner that permits its floor or bottom plate to be placed on the ground while loading, and raised and locked to a conventional height while it is being conveyed.

Another object of my invention is to provide a device of the character described that will permit the above mentioned function without any manual manipulation, being operated entirely by the coefficient of friction between the device and the ground while the trailer is being moved, by means of a tractor or automobile.

A still further object of my invention is to provide a device of the character described in which the operation may be reversed, that is, the floor or bottom of the trailer may be lowered by the same traction means.

A still further object of my invention is to construct a device so that it may be applied to any conventional type of wagon that is pulled by horses or the like.

It is manifest to anyone familiar with the use of trailers or wagons that the loading of the products onto the body is a laborious operation. For example, the farmer has to lift heavy bags or grain or the like onto the wagon or trailer prior to transporting and must again lift the bags from the body of the trailer when unloading. This operation becomes even more laborious when livestock is being transported, when it becomes necessary and even hazardous to lead livestock up a ramp or tail gate, and back the livestock down off the body of the conveyance. The device described and illustrated herein permits the floor to be lowered to the ground while loading and unloading and retaining it in a lifted position during transportation.

Other and further objects of my invention will become more apparent as the description proceeds and when taken in conjunction with the drawings in which Figure 1 is a side view of a two-wheel trailer showing the platform or bottom board resting on the ground or pavement.

Figure 2 is a fragmentary top of floor plan of one side of the device as shown in Figure 1, and Figure 3 is a side view as shown in Figure 1, but with the body in a raised position and locked for transporting.

Similar characters of reference indicate corresponding parts throughout the several views, and referring now to the same, the character 10 indicates a trailer body having a top rail 11 and cross members at its bottom shown as 12. There are a pair of frame members 13 joined at their forward end by means of a cross member 14 which acts as a support bar for the attachment of the draw bar shown as 15, which may be equipped with any conventional type of hitch arrangement, not shown, to permit its attachment to a tractor, truck or automobile, if the device is to be employed as a trailer, or the draw bar may be replaced with a conventional "tongue" if the device is constructed as a horse drawn vehicle.

The body of the vehicle may be any desired construction. It may be provided with stakes to be fitted into the support shown as 16, or it may have high side walls when cattle or the like are to be transported. Again, it may be just a flat platform, depending on the purpose for which the device is to be constructed. The frame members 13 are provided with downwardly extending brackets 17 which act as a mounting guide for the wheels shown in phantom as 18, and which are shown mounted to the depending end of the cantilever type spring shown as 19, which is attached by means of U-bolts 20 to the frame member 13. The brackets 17 are equipped with slots 21 to accommodate the movement of the wheel bearing 22 while it is being guided.

The brackets 17 also act as a support for rightangularly disposed lifting arms 23. These arms 23 being pivotally supported by the bracket 17 at 24. There are auxiliary guide arms 25 pivotally attached at 26 to the auxiliary brackets 27 attached to the forward end of each of the frame members 13 and extending downward therefrom. Obviously, the pivoted attaching points 24 and 26 are disposed at the same height and the length of the lower portion of the arm 23 from the point of attachment 24 to its attachment to the cross member 12 at 28 would be the same as the length of the auxiliary guide arm 25 from the point of attachment 26 to its point of attachment 28 to the cross member 12. The upper part of the lifting arm 23 is provided with a link member 29 attached at 30 to the arm 23 and the other end of the link member 29 is attached at 31 to the upper end of a radially formed traction lever 32 equipped with a traction shoe 33 which extends outward therefrom and is of a width sufficient to accommodate the tire of the wheel 18 when the wheel 18 rests therein at a time when the body 10 of the wheel is in a lowered position. When the vehicle is pulled forward by means of a tractor or the like attached to the draw bar 15, it will cause the traction shoe 33 to rotate clockwise and pull the link member 29 forward, pivoting the lifting arm 23 at 24, causing the lower end of the lifting arm 23 attached at 28 to the cross member 12 to be brought upward, thereby raising the body 10 to a point where the retaining hook 34 which is pivotally mounted to the support 35 which is attached to the frame member 13 to engage the notch 36 in the traction member 32 to hold the body 10 in a raised position. As the lever 32 is revolved the raised portion 37 terminating into a hook member 38 wil contact the roller 39 on the lever 33, thereby moving the shoe 33 away from the outer periphery of the tire on the wheel 18 as shown at 40 in Figure 3.

When the body 10 is to be lowered for unloading the cattle or product, it is merely necessary to pull the lever 41 causing the hook 34 to disengage the notch 36 in the arm 32, and as the device is moved backward by the tractor, the shoe 33 will engage the ground or surface of the pavement, thereby actuating the lever 23 and bringing the loaded body 10 downward, and it is only necessary to back the cattle off on the level ground or to drag the bag of grain or the like without the necessity of lifting any weight.

It is obvious that the traction shoe 33 may be equipped with cleats to increase the traction or coefficient of friction with the road or ground.

In the chosen embodiments of my invention, there are features not heretofore displayed in the prior art, and although I have shown a particular construction, and a specific arrangement of the component parts constituting the device, I am fully cognizant of the fact that many changes in their form and configuration may be made that will in no way affect their operativeness or efficiency, and I reserve the right to make such changes as I may deem necessary or convenient without departing from the spirit of my invention or the scope of the appended claims.

Having thus described my invention, what I claim and desire to secure by Letters Patent of the United States is:

1. A device of the character described comprising in combination, a body, a pair of frame members, said frame members extending parallel to the sides of said body, a cross member at the front of said frame members, a draw bar attached to said cross bar, said frame members provided with downwardly extending wheel guide brackets, wheels, said wheels provided with axles, springs attached at one end to said frame members, said wheel axles journaled in the depending end of said springs, lifting arms, said lifting arms of angular contour pivotally mounted at the center to said downwardly extending wheel guide brackets, auxiliary brackets attached to said frame members at a point forward from said wheel guides, auxiliary guide arms pivotally mounted at one of their ends to said auxiliary brackets, cross members at the bottom of said body, said cross members attached to the depending lower ends of said auxiliary guide arms and said lifting arms, arcuated traction levers, said traction levers provided with link members, the link members being attached to said traction levers at the upper end, traction shoes attached to said traction levers at their lower end, said traction shoes radially disposed, projecting means on the upper face of said traction levers, retaining means on said frame members for engagement with said projecting means, rollers on said lifting arms, an angularly disposed face on the inside of said traction levers, said rollers on said lifting arms arranged for engagement with the angular face on said traction levers when said traction levers are radially brought forward by means of said links, and means for releasing said retaining means when the traction levers are to be brought back to its normal position.

2. A device of the character described comprising a body portion, a pair of frame members extending parallel to the sides of said body portion, a cross member, said cross member supporting the forward ends of said frame members, a draw bar attached to said cross member, a wheel guide bracket attached to and extending downward from each of said frame members, a pair of springs attached at one of their ends to said frame members, a pair of wheels, said wheels mounted on axles, said axles journaled within the depending end of said spring members, lifting arms of right angle contour, said lifting arms pivotally attached at a central point to each of said wheel guide brackets, a pair of auxiliary brackets, a pair of auxiliary brackets attached to said frame members at a point forward from said wheel guide brackets, auxiliary guide arms pivoted at one end to said auxiliary brackets, the lower ends of said lifting and auxiliary guide arms attached to the lower portion of said body structure, an arcuated traction lever, link members attached to said traction lever at its upper end and to the upper end of said lifting arm, said traction lever equipped with a radially disposed traction shoe at its lower end, retaining means mounted on said frame member for engagement with said traction lever, and means for releasing said retaining means from said traction lever when the device is to be brought back to its normal position after said traction lever has been revolved.

3. A trailer device of the character described comprising in combination a trailer body, a pair of frame members extending longitudinally parallel to the sides of said trailer body, a cross member attached to the front of said frame member, said cross member retaining said frame members in relation to one another at their front end, a draw bar attached to said cross member, a pair of wheel guides extending downward from said frame members, a pair of springs attached at one of their ends to said cross members, a pair of wheels, axles supporting said wheels, said axles journaled within the depending end of said spring members, a pair of lifting arms, said lifting arms of right angle contour pivoted and mounted at their center to said wheel guide brackets, said wheel guide brackets provided with slots therein for guiding the axles of said wheels, a pair of auxiliary brackets attached to said frame members at a point forward from said wheel guide brackets, a pair of auxiliary guide arms, said guide arms pivotally attached at their upper ends to said auxiliary brackets, and at their lower ends to the bottom of said body portion, the lower end of said lifting arms attached to the body portion of said trailer, arcuated traction levers, said traction levers disposed for surrounding the peripheral surface of said wheels, link members, said link members attached at one end to said traction levers and at the other end to the upper end of said lifting arms, traction shoes attached to the lower end of said traction levers, said traction shoes radially disposed and of a contour to accept the peripheral surface of said wheels, a projecting means on the upper face of said traction levers, retaining means on said frame members for engaging the projecting means of said traction levers, rollers on the lifting levers, said rollers arranged for engagement with the upper face of said traction levers, and means attached to said frame members for releasing the engaging means on said traction levers when the device is to be brought to its normal position.

BERNARD J. PAULSON.

REFERENCES CITED

The following references are of record in the file of this patent:

UNITED STATES PATENTS

| Number | Name | Date |
|---|---|---|
| 2,442,071 | Bunten | May 25, 1948 |
| 2,466,102 | Heldenbrand | Apr. 5, 1949 |
| 2,479,421 | Sempe | Aug. 16, 1949 |